March 26, 1940.  E. G. BIEDERMAN  2,194,687
GANG SPOT WELDER
Filed July 5, 1938
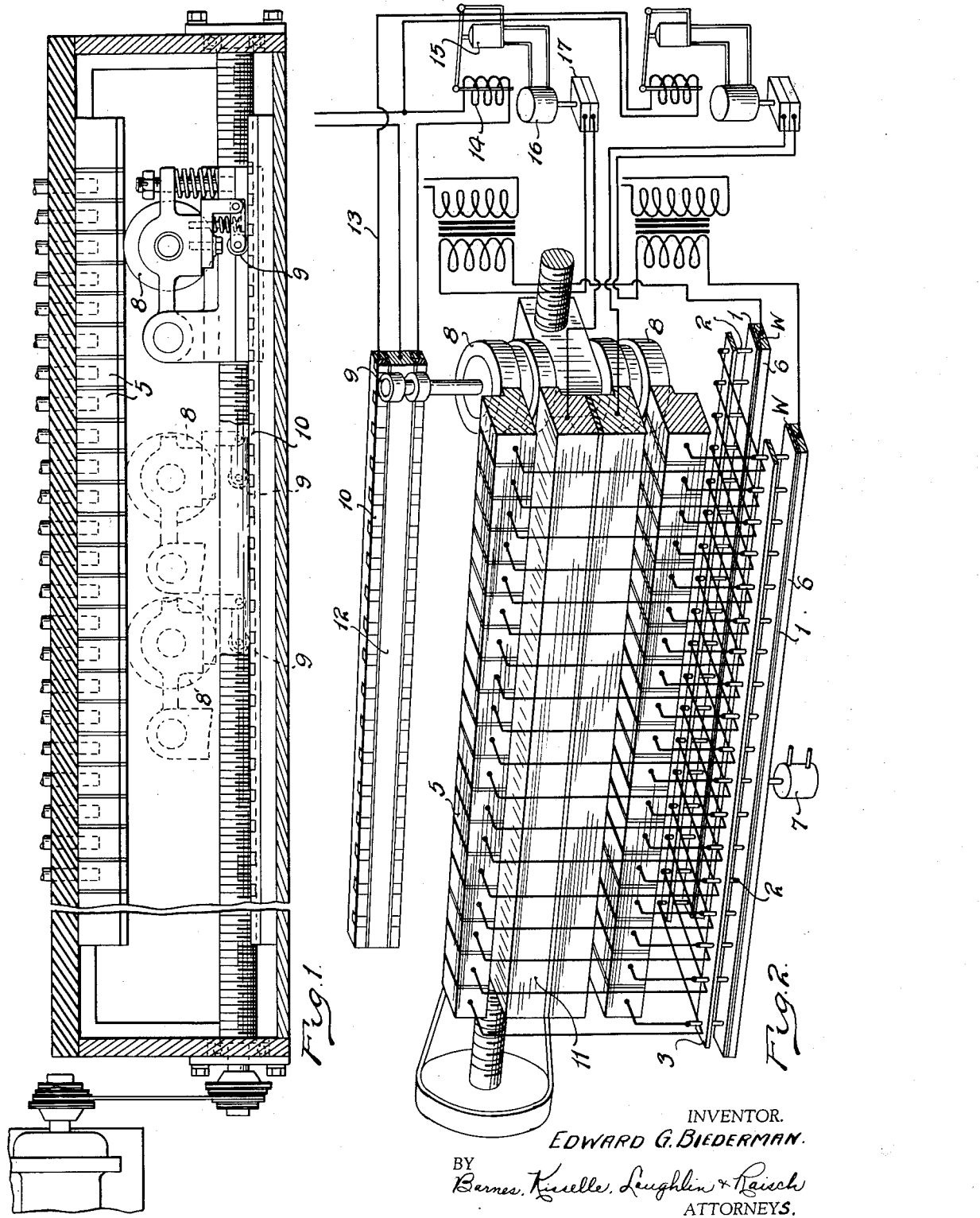
INVENTOR.
EDWARD G. BIEDERMAN.
BY
Barnes, Kisselle, Loughlin & Raisch
ATTORNEYS.

Patented Mar. 26, 1940

2,194,687

UNITED STATES PATENT OFFICE 2,194,687

GANG SPOT WELDER

Edward G. Biederman, Detroit, Mich., assignor to General Motors Corporation, Detroit, Mich., a corporation of Delaware Application July 5, 1938, Serial No. 217,399

1 Claim. (Cl. 171—97)

This invention relates to welding apparatus and for its object a gang spot welder in which all the electrodes are arranged to remain in contact with the work while the successive welding operations take place. The successive electrodes for successive welding shots are selected by a plurality of secondary switches, preferably in the form of a commutator brush or roller and commutator segments. This much of the apparatus is old and described and claimed in the co-pending application of Joseph R. Lex, executed June 13th, 1938.

The improvement involved in this application resides in an arrangement in which the circuit breaker or timing switch is located in the secondary circuit so as to speed up the operation.

Referring to the drawing:

Fig. 1 is a plan view of the control mechanism.

Fig. 2 is a diagrammatic view.

I is a movable support for the work. The electrodes 2 are supported in a stationary frame 3. There are two sets of electrodes and two pieces of work shown in the drawing. This is not necessary. The drawing simply happens to show a machine of double capacity. The commutator segments are designated 5 and are insulated one from another and each leads to a stationary electrode 2. The bus bar I can be raised and lowered by a pneumatic cylinder 7. The rise of the work is gradual and, hence, there is no pounding and wearing of the electrodes as is customary in gang spot welding where successive welds are made by the opening and closing of successive sets of electrodes. The electrode circuits in the secondary are successively closed by bridging rollers or brushes 8. On the same shaft are further bridging rolls or brushes 9 that close control circuit segments 10. The secondary segments 5 are paired with a bus bar 11 and control segments 10 are paired with the bus bar 12 to complete the respective circuits.

Each roll 8 acts as a selector for the branch secondary circuit through which the current will be shot. Each bridging roll 9 simply energizes the control circuit 13 which controls a solenoid 14 and operates an air valve 15 which throws air above or below the piston in cylinder 16 which operates the breaker switch 17 in the secondary. This breaker switch may have suitable devices, such as an oil bath, or magnetic arc snuffer (not shown) for dealing with the arc which is bound to occur at the secondary circuit switch.

The segments in the control circuit are shorter than the segments in the secondary circuit as will be seen by making comparison in Fig. 1 and they are also located one with respect to the other so that the secondary circuit is closed before and opened after the breaker switch. This means that the electrode switches are opened and closed while the circuit in which each is located is a dead circuit and, consequently, there is no arcing except at the breaker switch. This breaker switch may have, as already explained, an arrangement for dealing with the arc and it also may have easily removable contacts.

By putting the breaker switch in the secondary circuit, the contacts can be arranged to be very close together when the switch is open for the reason that the voltage is very low in the secondary and there is no temptation for the current to leap the gap. By employing this very small gap, the switch movement can be minimized and, hence, be very much more rapid, resulting in faster welding than where the breaker switch is in the primary and the contacts have to be farther apart.

I claim:

In an electric control device, a plurality of electric energy consuming devices arranged to receive successive shots of electrical energy and a switching and a current supply system for successively supplying energy to said devices comprising a primary circuit continuously closed during the operation of the device and a secondary circuit having a voltage step down arrangement with the primary circuit and having a plurality of secondary branches one for each energy consuming device and a gap in each branch, means for successively opening and closing these gaps, the said branches joined to a common secondary circuit line provided with a single gap, and a circuit breaker switch in said common secondary circuit line for closing and opening said gap and means for closing and opening the several branch gaps in the secondary circuit successively and for causing the said breaker switch to close and open said gap in the common secondary circuit line in timed relation each time with the closing and opening of the branch circuits, the said breaker switch gap opening each time before the gap in a secondary circuit branch is opened, the secondary breaker switch contacts being relatively closely spaced when open to afford relatively great rapidity in the opening and closing of the breaker switch.

EDWARD G. BIEDERMAN.